(No Model.)

S. E. GROSS.

SEED PLANTING.

No. 407,822. Patented July 30, 1889.

Witnesses:
Homer C. Gross
Harry T. Jones

Inventor:
Samuel E. Gross

UNITED STATES PATENT OFFICE.

SAMUEL E. GROSS, OF CHICAGO, ILLINOIS.

SEED-PLANTING.

SPECIFICATION forming part of Letters Patent No. 407,822, dated July 30, 1889.

Application filed March 25, 1889. Serial No. 304,736. (No model.)

*To all whom it may concern:*

Be it known that I, SAMUEL E. GROSS, residing at Chicago, in the county of Cook and State of Illinois, and a citizen of the United States, have invented a new and useful Improvement in Seed-Planting, of which the following is a specification, reference being had to the accompanying drawings, in which—

Figure 1:
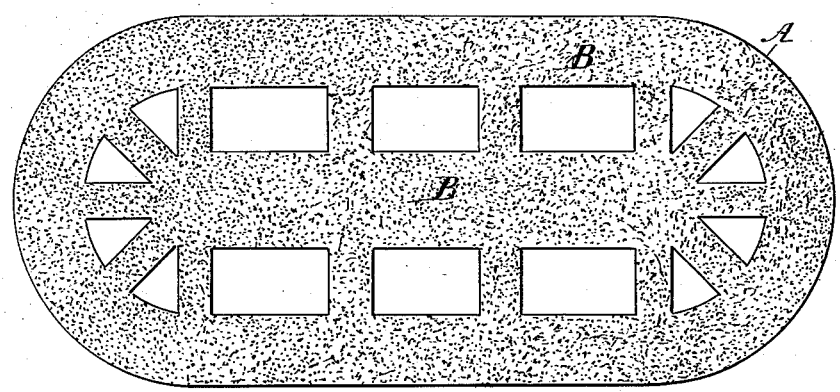
Figure 2:
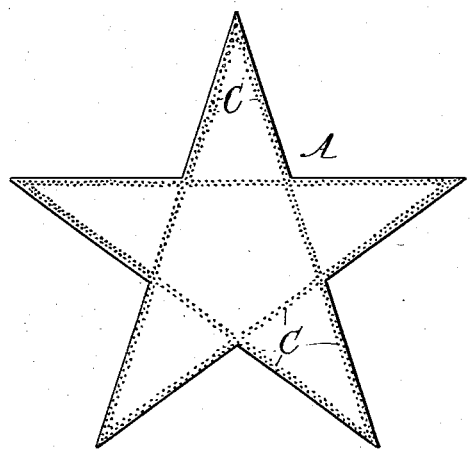
Figure 3:
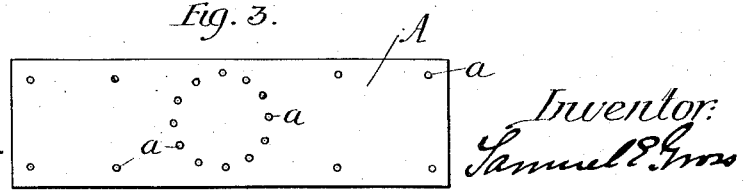

Figure 1 is a plan representing one form of my device. Fig. 2 represents another form; Fig. 3, still another form.

It is common to plant the seeds of flowers and other plants so that the plants will appear in various ornamental and regular designs or forms. As this has been done prior to the making of my invention, the designs have been made directly on or in the ground, and it has required considerable skill and labor to insure success, and many persons have not the skill and time to prepare various designs and secure the desired results.

The object of my invention is to provide for arranging seeds to be planted in regular forms, so that they can be readily placed in the ground without disarrangement, whereby, when the seeds germinate, the plants will appear in the desired form, which I accomplish by securing the seeds arranged in the desired form or forms upon a foundation of thin cloth, paper, or other suitable material by means of a paste that serves to attach the seed and will supply nutriment to the plant, which foundation, with the seeds thereon, can be placed in the ground, thereby avoiding the necessity of laying out designs for flower-beds upon the ground and planting the seeds, as has heretofore been done, and securing better reproduction of the desired design by the growing plants than will ordinarily be produced by planting the seeds directly in the ground.

In carrying out my invention I take either a loosely-woven cloth—such as cheese-cloth—perforated paper, or paper which is not perforated, or other suitable material which is easily disintegrated, and lay out thereon any desired design or form, and coat the design, or any desired part thereof, with paste or other suitable adhesive material, which will supply nutriment to the plant, and place on such paste the seeds to be planted. If the completed design or form is to be handled much or transported, the seeds may be covered with paste or other suitable adhesive material, which will prevent the loss or displacement of the seeds.

In the drawings, A represents the foundation, which may be of cheese-cloth, paper, or other suitable material.

B represents flower-seeds upon the paste or other suitable adhesive material which has first been applied to those portions of the foundation which form the design.

As shown in Fig. 1, the cloth or other material used for the foundation has been cut away outside of the seeds, and the unused interior portions of the cloth are also supposed to be cut away, which I think it will be desirable to do before planting; but if the design is to be handled or transported it will be better not to cut away these parts until the design is to be placed in the ground. For small designs the unused interior portions of the foundation may be left, if desired, as indicated in Fig. 2, in which I have represented a star. A in this figure represents the foundation, and C the seeds secured thereon.

It will frequently be desirable to arrange single seeds in regular forms, as indicated in Fig. 3, in which the foundation A is represented.

*a* are single seeds secured to the foundation in any suitable manner. In Fig. 3 I have shown at each end of the foundation A four seeds arranged in the form of a square, and in the center a number of single seeds arranged in the form of a circle. In planting, the foundation, with the seeds secured thereto, is to be placed upon or in the ground and covered with a sufficient quantity of earth. The moisture of the earth will soon disintegrate the paste or other adhesive material used, and the foundation will not be in the way of the roots from the seeds, which roots will penetrate the earth below the foundation, which will soon rot and be out of the way of the growing plants. The paste or other adhesive material may be of such a nature that it will furnish food for the young plants.

I do not limit myself to the use of the special designs and forms represented in the drawings. They only illustrate a few of the many ways in which seeds can be arranged for planting by the use of my invention. A great variety of patterns or designs may be provided.

For simple forms—such as those shown in Fig. 3—the paste or other adhesive material, if used, may be applied directly to each seed, if preferred, instead of being placed upon the foundation.

It will be understood that seeds of annual plants will ordinarily be used, and as many varieties of seeds can be used in a single design as may be desired, they being distributed upon the foundation so as to produce the desired arrangement of colors. By my invention the seed are attached to the foundation by the paste, and I avoid covering the seed, which would interfere with their germination.

What I claim as new, and desire to secure by Letters Patent, is as follows:

As a new article of manufacture, a foundation for planting seed, consisting of a sheet of fabric having its surface supplied with paste and seed attached to the fabric by the paste in the regular form that the plants are desired to appear in the ground, substantially as described.

SAMUEL E. GROSS.

Witnesses:
HOMER C. GROSS,
HARRY T. JONES.